US007139924B2

(12) United States Patent
Wang

(10) Patent No.: US 7,139,924 B2
(45) Date of Patent: Nov. 21, 2006

(54) IDE CONTROL DEVICE SUITABLE FOR SUPPLYING A PLURALITY OF REQUESTED CLOCK SIGNALS TO VARIOUS HARD DISCS

(75) Inventor: Tse-Hsien Wang, Bade (TW)

(73) Assignee: Via Technologies, Inc., Taipei (TW)

( * ) Notice: Subject to any disclaimer, the term of this patent is extended or adjusted under 35 U.S.C. 154(b) by 503 days.

(21) Appl. No.: 10/119,760

(22) Filed: Apr. 11, 2002

(65) Prior Publication Data

US 2003/0149906 A1    Aug. 7, 2003

(30) Foreign Application Priority Data

Feb. 7, 2002    (TW) ................. 91102168 A

(51) Int. Cl.
*G06F 1/06*    (2006.01)
(52) U.S. Cl. ..................... 713/500; 713/501
(58) Field of Classification Search ............... 713/600, 713/503, 500, 501; 710/58; 700/117; 360/69; 395/556
See application file for complete search history.

(56) References Cited

U.S. PATENT DOCUMENTS

| | | | | |
|---|---|---|---|---|
| 4,858,038 A | * | 8/1989 | Kazama ..................... 360/69 |
| 5,142,247 A | * | 8/1992 | Lada et al. .................. 331/14 |
| 5,258,655 A | * | 11/1993 | May et al. .................. 307/139 |
| 5,491,814 A | * | 2/1996 | Yee et al. .................. 713/501 |
| 5,586,308 A | * | 12/1996 | Hawkins et al. ............ 713/501 |
| 6,510,473 B1 | * | 1/2003 | Voit ............................. 710/58 |
| 6,577,912 B1 | * | 6/2003 | Ueda et al. ................ 700/117 |
| 6,587,956 B1 | * | 7/2003 | Hiratsuka et al. .......... 713/500 |
| 6,628,469 B1 | * | 9/2003 | Hoyt ............................. 360/69 |
| 6,651,181 B1 | * | 11/2003 | Lacey ........................ 713/503 |

OTHER PUBLICATIONS

Kozierok Charles M., Independent Master/Slave Device Timing, Apr. 17, 2001, http://web.archive.org/web/20001214011300/http://www.pcguide.com/ref/hdd/if/ide/confTiming-c.html.*
Risley David, Hard Drives/IDE Interface, Nov. 9, 2001, http://web.archive.org/web/20011109125612/http://www.pcmech.com/show/harddrive/78/.*
Programmed I/O (PIO) Modes, Apr. 17, 2001, http://www.PCGuide.com.*

* cited by examiner

*Primary Examiner*—Chun Cao
*Assistant Examiner*—Mark Connolly
(74) *Attorney, Agent, or Firm*—Rosenberg, Klein & Lee

(57) ABSTRACT

The present invention discloses an IDE control device suitable for any clock frequency specification. The circuit configuration of the device comprises: a phase-locked loop for receiving clock signals generated from a clock generator and thereby generating a plurality of requested clock signals; and an IDE controller, comprising: a selection module for selecting suitable clock signals and switching active hard discs, and an interface module for generating signals to be transmitted; wherein the selection module is connected to the phase-locked loop and selects clock signals suitable for various hard discs, and then the interface module generates corresponding signals to be transmitted through an IDE bus to access a corresponding hard disc.

8 Claims, 4 Drawing Sheets

IDE CONTROL DEVICE SUITABLE FOR SUPPLYING A PLURALITY OF REQUESTED CLOCK SIGNALS TO VARIOUS HARD DISCS

BACKGROUND OF THE INVENTION

1. Field of the Invention

The present invention generally relates to an integrated device electronics (IDE) control device and, more particularly, to an IDE control device suitable for any clock frequency specification, which is characterized in that an IDE controller comprises a phase-locked loop and a selection module so as to generate and select clock signals suitable for various hard discs such that the data transmission rate is enhanced.

2. Description of the Prior Art

In recent years, with the high development in information-related industries, people have increasing needs for a higher operation speed as well as a higher data transmission rate of information products. In view of this, the industries have made lots of efforts and continuously proposed various specifications for new products. For example, various specifications for hard discs such as ATA (advanced technology attachment), ATA33, ATA66, ATA100 and ATA133 have been disclosed. The data transmission rate of a hard disc increases whenever a new specification is proposed.

Even though most of the new specifications can be used for the old products, they may, however, adversely affect the performance. Please refer to FIG. 1, which is a block diagram of the conventional IDE control device. As shown in the figure, the main control chip 14 (for example, a south bridge chip) comprises an IDE controller 16 that is connected to and controls a first hard disc 18 and a second hard disc 19 through an IDE bus 17. Furthermore, a clock signal generator 12 is included to generate clock signals, by which the IDE controller 16 generates a transmission signal. The generated clock signals may vary in frequency according to various specifications for the motherboard, for example, 100 MHz for PC100 and 133 MHz for PC133. More particularly, for PC100, even though the frequency of the clock signal is 100 MHz, an ATA133 hard disc with higher data transmission rate cannot bring its performance into full play. On the contrary, a PC133 motherboard providing an external clock frequency of 133 MHz can perfectly match an ATA133 hard disc to achieve an enhanced data transmission rate. However, when a PC133 motherboard is used together with an ATA100 hard disc that transmits a word in 17 to 20 ns (equivalently, 2 clock cycles for PC100), it can only achieve the performance of a clock frequency of 89 MHz since it takes 3 clock cycles (where each clock cycle for PC133 is 7.5 ns) to transmit a word.

Therefore, there is need in providing an IDE control device suitable for any clock frequency specification in view of the above problems such that various products with different specifications can be compatible.

SUMMARY OF THE INVENTION

Accordingly, it is the primary object of the present invention to provide an IDE control device suitable for any clock frequency specification, characterized in that an IDE controller comprises a phase-locked loop and a selection module so as to generate and select clock signals suitable for various hard discs such that the data transmission rate is enhanced.

It is another object of the present invention to provide an IDE control device suitable for any clock frequency specification, further comprising a plurality of phase generators for generating phase signals corresponding to clock signals of different frequencies.

It is still another object of the present invention to provide an IDE control device suitable for any clock frequency specification, wherein the selection module comprises a plurality of selectors for selecting clock signals suitable for various hard discs and switching active hard discs corresponding to the accessed signals of the system.

It is still another object of the present invention to provide an IDE control device suitable for any clock frequency specification, wherein the interface module comprises a phase relation circuit for processing signals related to phase.

In order to achieve the foregoing objects, the present invention provides an IDE control device suitable for any clock frequency specification, comprising: a phase-locked loop for receiving clock signals generated from a clock generator and thereby generating a plurality of requested clock signals; and an IDE controller, comprising: a selection module for selecting suitable clock signals and switching active hard discs, and an interface module for generating a transmission signal; wherein the selection module is connected to the phase-locked loop and selects clock signals suitable for various hard discs, and then the interface module generates a corresponding transmission signal through an IDE bus to access a corresponding hard disc.

Other and further features, advantages and benefits of the invention will become apparent in the following description taken in conjunction with the following drawings. It is to be understood that the foregoing general description and following detailed description are exemplary and explanatory but are not to be restrictive of the invention. The accompanying drawings are incorporated in and constitute a part of this application and, together with the description, serve to explain the principles of the invention in general terms. Like numerals refer to like parts throughout the disclosure.

BRIEF DESCRIPTION OF THE DRAWINGS

The objects, spirits and advantages of the preferred embodiment of the present invention will be readily understood by the accompanying drawings and detailed descriptions, wherein.

DETAILED DESCRIPTION OF THE INVENTION

The present invention providing an IDE control device suitable for any clock frequency specification can be exemplified by the preferred embodiment as described hereinafter.

Figure 1:
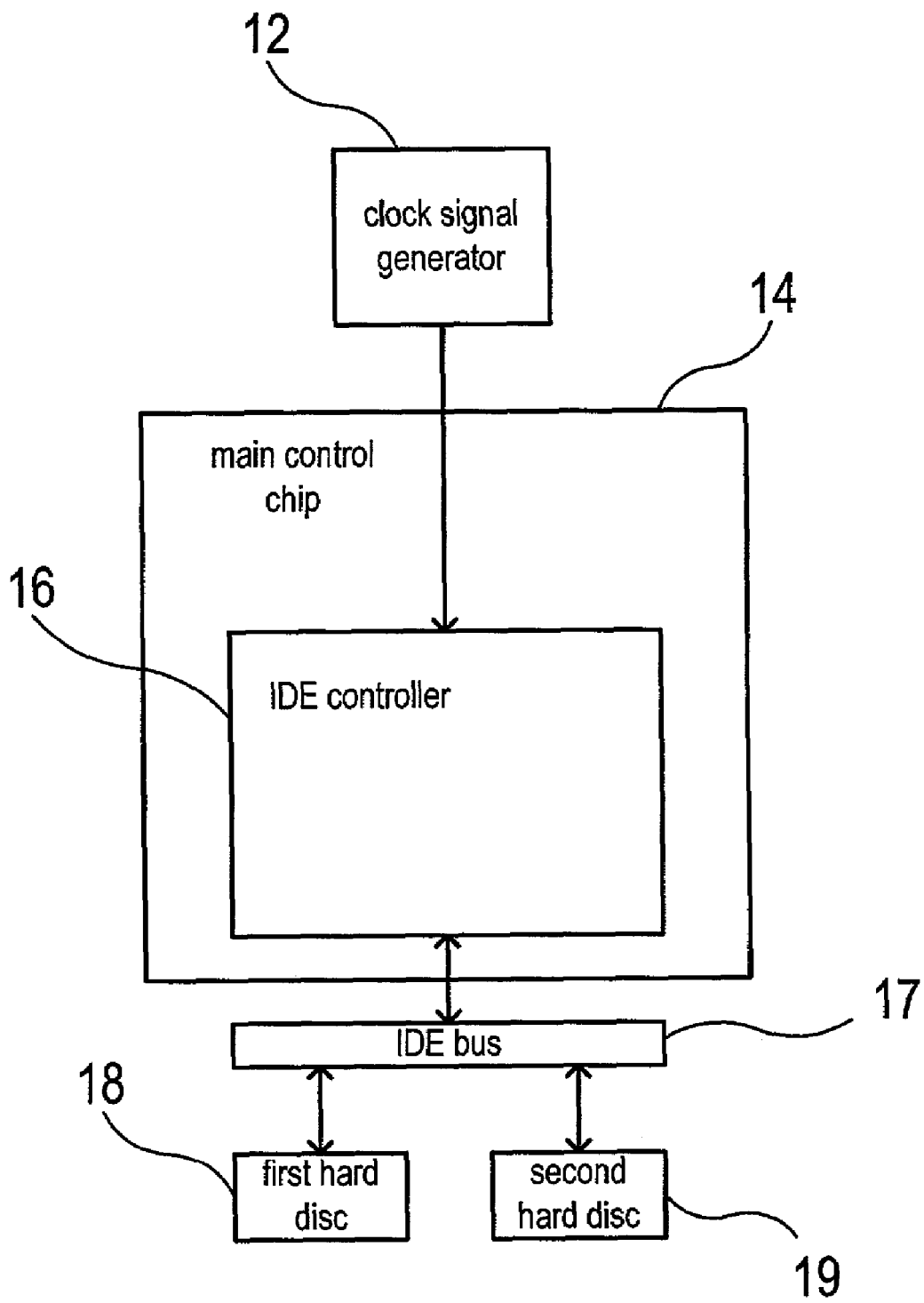
FIG. 1 is a block diagram of an IDE control device in accordance with the prior art.
Figure 2:
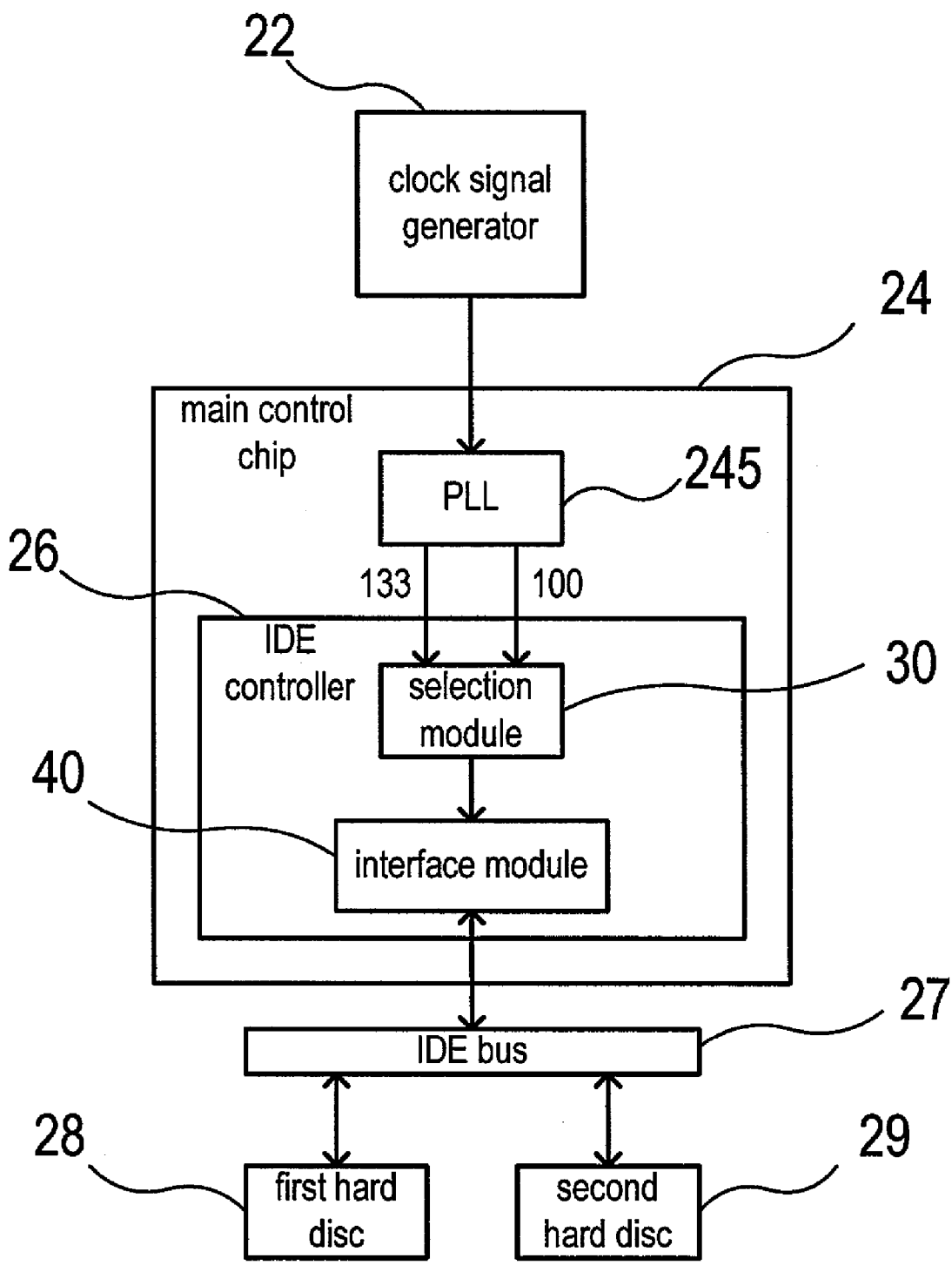
FIG. 2 is a block diagram in accordance with one preferred embodiment of the present invention.

To start with, please refer to FIG. 2, which is a block diagram in accordance with one preferred embodiment of the present invention. As shown in the figure, the IDE control device comprises a phase-locked loop (PLL) 245 for receiving clock signals generated from a clock signal generator 22 and thereby generating a plurality of requested clock signals, such as clock signals of 100 MHz and 133 MHz and so on. The generated clock signals are then transmitted to a selection module 30 installed in the IDE controller 26. When the system is turned on, the selection module 30 selects clock signals suitable for various hard discs according to the detected specifications for the hard discs. When the system is in operation, the selection module 30 switches the active hard discs corresponding to the access requests of the system. The signals are then transmitted to an interface module 40 for generating a transmission signal through an IDE bus 27 to access a corresponding hard disc, such as a first hard disc 28 or a second hard disc 29.

Figure 3:
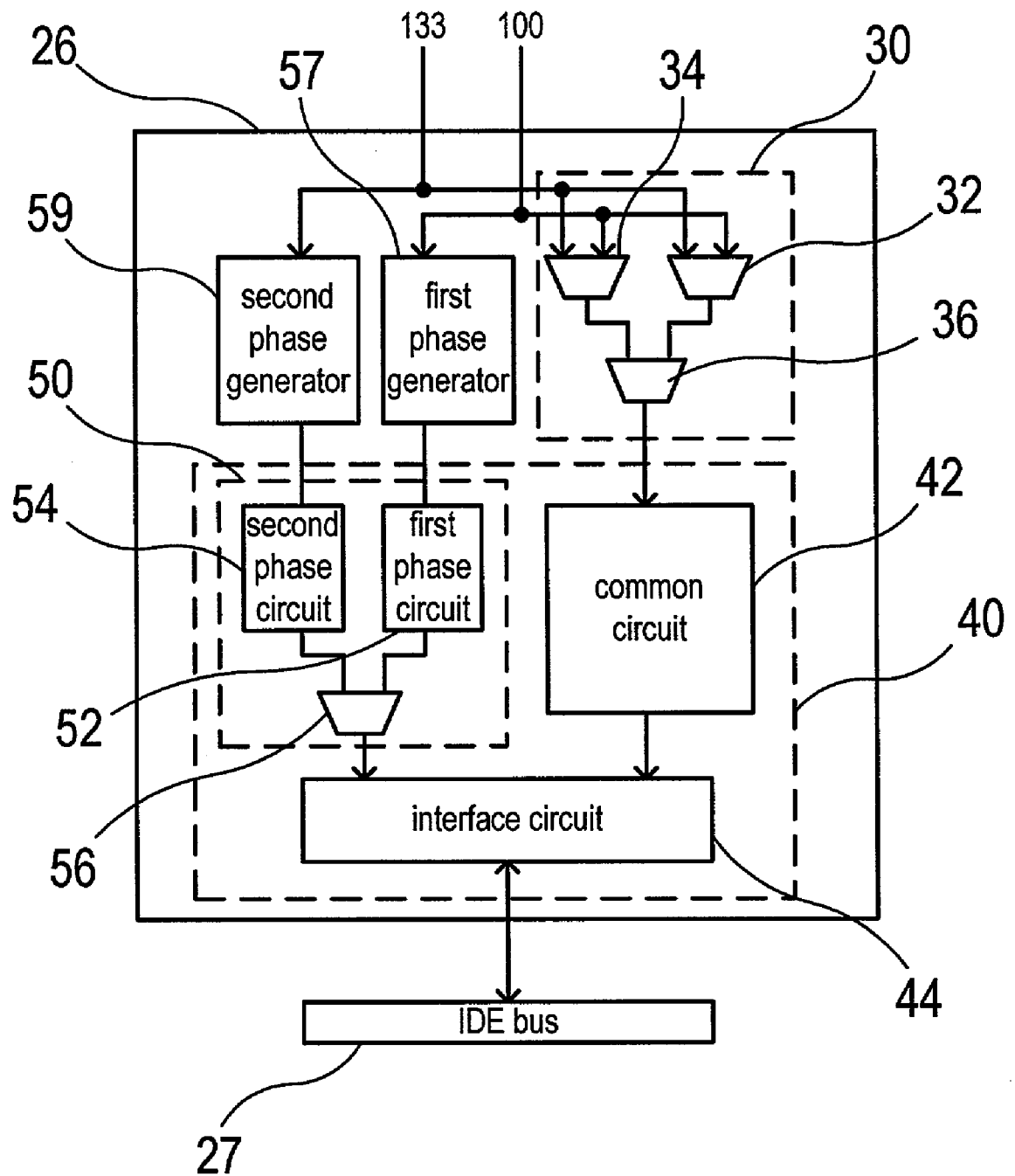
FIG. 3 is a block circuit diagram showing the selection module and interface module in accordance with one preferred embodiment of the present invention.

Furthermore, please refer to FIG. 3, which is a block circuit diagram showing the selection module and interface module in accordance with one preferred embodiment of the present invention. As shown in the figure, the selection module 30 according to the preset invention comprises a plurality of selectors (or multiplexers), in which a first clock selector 32 corresponds to the first hard disc 28 and a second clock selector 34 corresponds to the second hard disc 29. When the system is turned on, the first clock selector 32 selects the clock signals of 100 MHz or 133 MHz according to the result of the detection for the first hard disc 28. Similarly, the second clock selector 34 selects the clock signals suitable for the second hard disc 29. In addition, a hard disc selector 36 switches an active hard disc corresponding to the request of an access signal. The IDE controller 26 further comprises a plurality of phase generators such as a first phase generator 57 and a second phase generator 59, for receiving clock signals of 100 MHz or 133 MHz, respectively, to further generate corresponding phase signals. The signals from the phase generators and the signals from the selection module 30 are transmitted to an interface module 40. The interface module 40 comprises a common circuit 42 and a phase related circuit 50. The common circuit 42 is connected to the selection module 30 and receives the signals from the selection module 30. The phase related circuit 50 includes a plurality of phase circuits, such as a first phase circuit 52 and a second phase circuit 54, each of which is connected to the corresponding phase generator to process the phase signals from the phase generator and transmit the processed signals to the interface circuit 44. The processed signals are then combined with the signals from the common circuit 42 to form a complete transmission signal to access the corresponding hard disc through the IDE bus 27.

Figure 4:
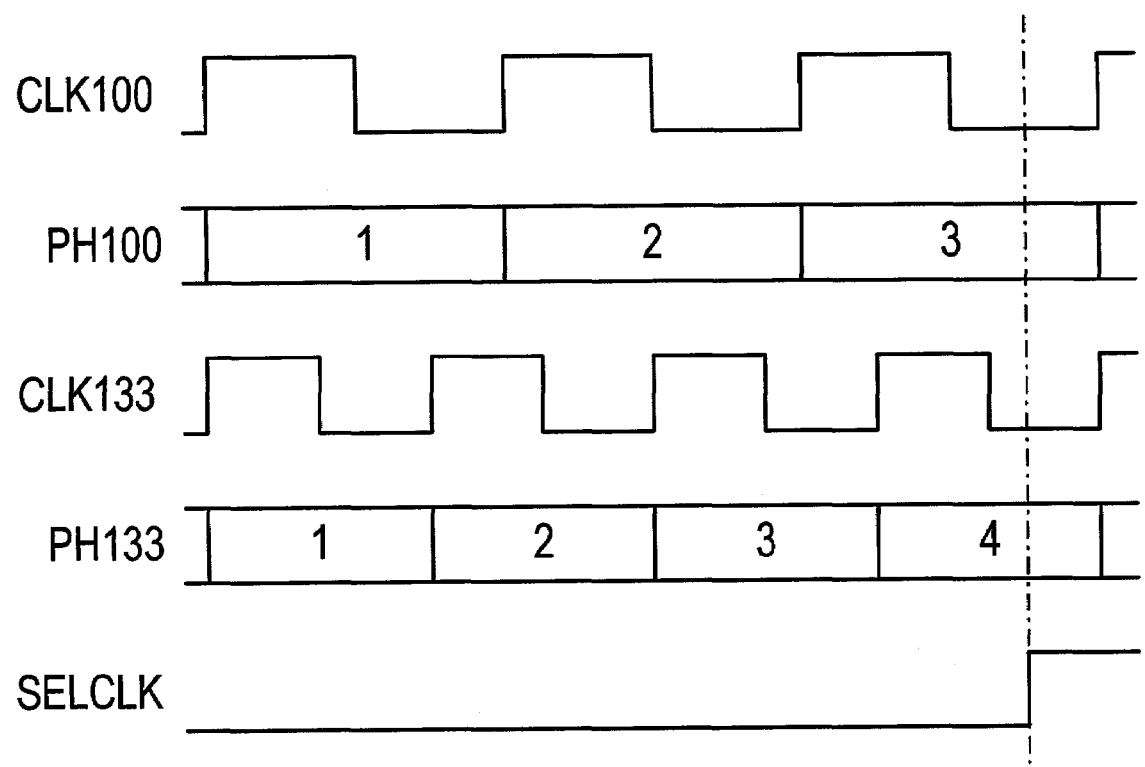
FIG. 4 shows clock trains representing the relation between the switching points and the phase in accordance with one preferred embodiment of the present invention.

At last, please refer to FIG. 4, which shows clock trains representing the relation between the switching points and the phase in accordance with one preferred embodiment of the present invention. As shown in the figure, the clock cycle is 10 ns and 7.5 ns for clock signals of 100 MHz and 133 MHz (PH100 and PH133), respectively. In other words, the time period of 4 clock cycles for CLK133 is as long as that of 3 clock cycles for CLK100. In order to prevent malfunctional operation due to different potential level of the clock signals, the switching point can be chosen between the falling edge of the quadruple cycle and the next rising edge of CLK133, such that both CLK100 and CLK133 are at the low potential level. However, the principle is not limited to the preferred embodiment and is applicable to other cases where clock signals with different frequencies to select the switching point.

The phase-locked loop and the IDE controller of the present invention can be integrated on a main control chip (as denoted "24" in FIG. 2). In other words, a phase-locked loop can be added to the main control chip (such as a south bridge chip) of the IDE control device according to the present invention so as to generate requested clock signals. On the other hand, the phase-locked loop can be installed in the IDE controller to utilize the generated signals.

According to the above discussion, it is apparent that the present invention discloses an IDE control device suitable for any clock frequency specification, which is characterized in that an IDE controller comprises a phase-locked loop and a selection module so as to generate and select clock signals suitable for various hard discs such that the data transmission rate is enhanced. Therefore, the present invention has been examined to be progressive, advantageous and applicable to the industry.

Although this invention has been disclosed and illustrated with reference to particular embodiments, the principles involved are susceptible for numerous other embodiments that will be apparent to persons skilled in the art. This invention is, therefore, to be limited only as indicated by the scope of the appended claims.

What is claimed is:

1. An IDE control device suitable for any clock frequency specification, comprising:
   a phase-locked loop for receiving clock signals generated from a clock generator and thereby generating a plurality of requested clock signals, each of said requested clock signals being of a different frequency; and
   an IDE controller, comprising a selection module for selection of suitable clock signals and switching active hard discs adaptive to a pre-selection from among a plurality of hard discs, and an interface module for generating a transmission signal;
   wherein said selection module is connected to said phase-locked loop and adaptively selects clock signals from said plurality of requested clock signals suitable for each of said plurality of hard discs responsive to detected transmission specifications of said hard discs, and said interface module generates a corresponding transmission signal through an IDE bus to access a corresponding hard disc, said IDE controller including a plurality of phase generators, each respectively connected to said phase-locked loop and able to receive corresponding clock signals to generate phase signals corresponding to said clock signals.

2. The IDE control device as claimed in claim 1, wherein said selection module comprises:
   a plurality of clock selectors, each respectively connected to said phase-locked loop so as to select clock signals suitable for said corresponding hard disc; and
   a hard disc selector, able to switch an active hard disc corresponding to the request of an access signal.

3. The IDE control device as claimed in claim 1, wherein said plurality of requested clock signals generated by said phase-locked circuit include clock signals of 100 MHz and 133 MHz.

4. The IDE control device as claimed in claim 1, wherein said device is integrated in a main control chip.

5. An IDE control device suitable for any clock frequency specification, comprising:
   a phase-locked loop for receiving clock signals generated from a clock generator and thereby generating a plurality of requested clock signals; and
   an IDE controller including (a) a selection module for selection of suitable clock signals and switching active hard discs from among a plurality of hard discs, said selection module being connected to said phase-locked loop and adaptively selects clock signals suitable for said plurality of hard discs, (b) a plurality of phase generators, each respectively connected to said phase-locked loop and able to receive corresponding clock signals to generate phase signals corresponding to said clock signals, and (c) an interface module for generating a transmission signal through an IDE bus to access a corresponding hard disc, said interface module including:

a common circuit, connected to said selection module and being independent of said clock signals and said phase signals;

a phase related circuit, connected to said phase generators to process said signals related to phase; and an interface circuit;

wherein both said common circuit and said phase related circuit are connected to said interface circuit to further form a complete transmission signal to access said hard disc through said IDE bus.

6. The IDE control device as claimed in claim 4, wherein said phase related circuit comprises:

a plurality of phase circuits corresponding to said phase generators, each respectively connected to said corresponding phase generator; and a phase selector connected to each of said phase circuits so as to select the signals from said phase circuit corresponding to said active hard disc to said interface circuit.

7. An IDE control device suitable for any clock frequency specification, comprising:

a phase-locked loop, for receiving clock signals generated from a clock generator and thereby generating a plurality of requested clock signals, each of said requested clock signals being of a different frequency;

a selection module connected to said phase-locked loop for adaptively selecting said plurality of requested clock signals suitable for various hard discs and switching active hard discs responsive to detected transmission specifications of said hard discs, said IDE controller including a plurality of phase generators, each respectively connected to said phase-locked loop and able to receive corresponding clock signals to generate phase signals corresponding to said clock signals; and an interface module connected to said selection module for generating a corresponding transmission signal and accessing a corresponding hard disc through an IDE bus.

8. The IDE control device as claimed in claim 7, wherein said selection module comprises:

a plurality of clock selectors, each respectively connected to said phase-locked loop so as to select clock signals suitable for said corresponding hard disc; and a hard disc selector, able to switch an active hard disc corresponding to the request of an access signal.

* * * * *